Jan. 26, 1937.  T. LORD  2,068,994
CUSHION JOINT
Filed June 24, 1935  2 Sheets-Sheet 1

INVENTOR.
Thomas Lord
BY H.C. Lord
ATTORNEYS.

Jan. 26, 1937.   T. LORD   2,068,994
CUSHION JOINT
Filed June 24, 1935   2 Sheets-Sheet 2
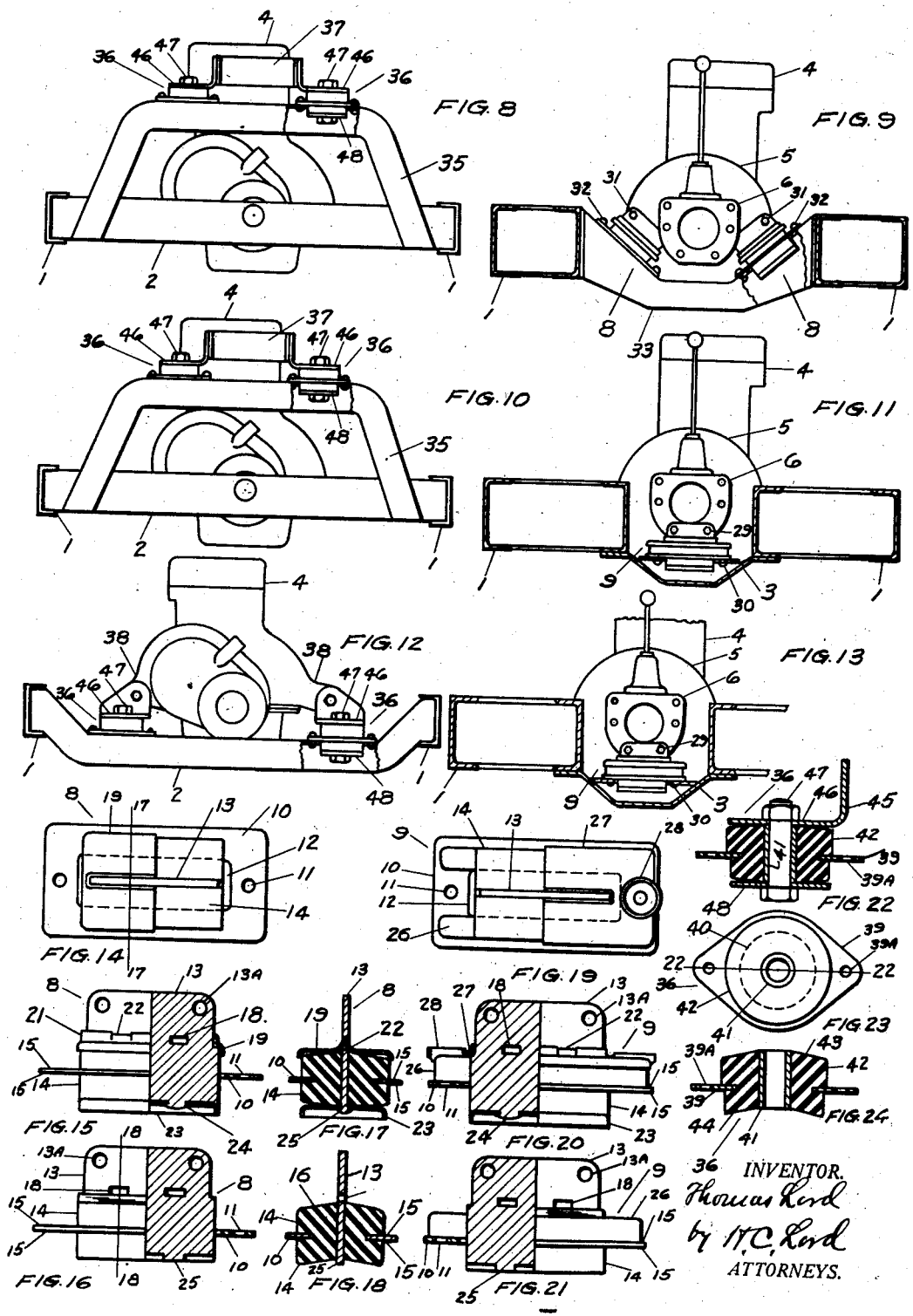

Patented Jan. 26, 1937

2,068,994

UNITED STATES PATENT OFFICE 2,068,994

CUSHION JOINT

Thomas Lord, Erie, Pa., assignor to Hugh C. Lord, Erie, Pa.

Application June 24, 1935, Serial No. 28,110

21 Claims. (Cl. 248—7)

This invention relates to cushion joints and in a general way is a carrying forward of the invention disclosed in Patent No. 1,996,210 granted to myself and Hugh C. Lord, for Joints, April 2, 1935.

In some environment it is desirable to make a shear sensitive mounting of comparatively large capacity in a small space and with convenient means of attaching the same for special installations. The present invention is particularly advantageous in this respect.

It is also desirable in some environments to provide substantially shear freedom in all directions in a given plane while maintaining greater resistance to movement in other directions. This is particularly true with rotating instruments where the vibratory disturbances are mostly in varying directions in the same plane. An example of such a condition is in relation to an automobile engine and in the present application the invention is exemplified with an automobile engine, and this application of the particular mounting forms a part of the present invention.

It is also desirable with shear type mountings of the general form disclosed in our former patent to vary the free shear zone of the mounting with variations of the load. This is accomplished in the present invention by engaging the portions of the rubber within the projected area of the opening, thus reducing the volume of rubber responsive to free shear action, and it is also desirable upon a further deflection of the mounting or joint to obstruct its further movement by bringing the portion of the rubber overlapping the plate into direct action and this is accomplished by extending the imposing restricting surfaces, movable with the joint, into overlapped position with the plate at the edges of the opening.

It is also desirable in some environments to provide substantial shear freedom in all directions in a given plane while maintaining greater resistance to movement in other directions. This is particularly true with rotating instruments where the vibrating disturbances are mostly in varying directions in the same plane as in an automobile engine. In this connection it is also desirable in order to accommodate the joint or mounting to varying periods of gravity and torque loads to vary the deflection resistance rate in different directions in the same plane. The adaptability of the structure to vary it to accommodate the conditions encountered is of great importance and is accomplished in a high degree in the present invention. Other features and details in the invention will appear in the specifications and claims.

A preferred embodiment of the invention is illustrated in the accompanying drawings as follows:

Figs. 8 and 9 are front and rear views of a further modification of an engine mounting.

Figs. 10 and 11 show another modification in the arrangement of mountings.

Figs. 12 and 13 are front and rear views of a further modification of the arrangement of mountings.

Fig. 14 is a plan view of a mounting joint the snubbing plate at one end of the mounting, being removed to better show construction.

Fig. 15 is a side view of the same mounting joint, one-half of the mounting being shown in section to better show the construction.

Fig. 16 is a side view of a mounting joint, partly in section and with the snubbing plates removed.

Fig. 17 is a section on the line 17—17 in Fig. 14.

Fig. 18 is a similar section on the line 18 in Fig. 16 with the snubbing plate removed and the rubber element relieved of load.

Fig. 19 is a plan view of a modification of the mounting, the snubber plate being removed from one end of the mounting.

Fig. 20 is a side elevation of the joint, one end of the joint being in section.

Fig. 21 is a side elevation of the joint with the snubber plates removed, one end of the joint being in section.

Fig. 22 is a section on the line 22—22, a modification of a joint of a plate form having a round opening as in the patent above referred to.

Fig. 23 shows a plan view of the structure shown in Fig. 22.

Fig. 24 is a section of the structure shown in Fig. 22 but with the rubber element relieved of load.

Figure 1:
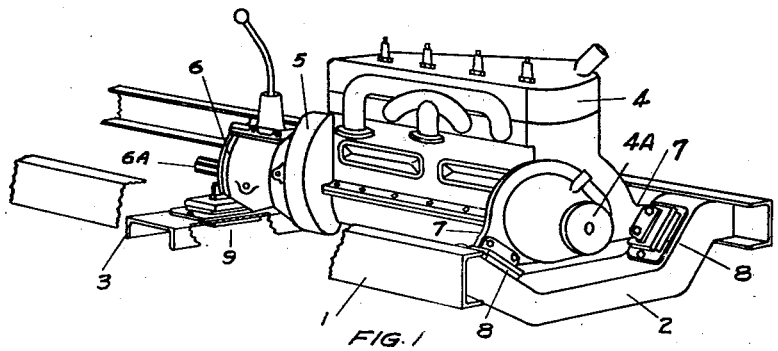
Fig. 1 shows a perspective view of an automobile engine.

1 marks the side frame of an automobile, 2 a front cross member and 3 a rear cross member. These sides and cross members may be of any desired size and form. The engine 4 has the rotating shaft 4a and is provided with the usual bell housing 5. The transmission 6 has the power take-off 6a. In the modification shown in Fig. 1, the front of the engine is carried by the mounting joint 8—8 and at the rear of the engine the mounting 9 is attached to the transmission.

The mounting joint 8—8 is shown in detail in Figs. 14 to 18 inclusive. In this structure 10 marks a plate provided with the perforations 11 for securing the plate to some member such as a supporting base, as shown in Fig. 1, a cross member of an automobile. The plate has a rectangular opening 12. It has an inner member in the form of a cross plate 13, which extends through the opening 12 in spaced relation to the edges of the opening. A rubber element 14 extends across the opening, the side edges of the rubber element overlapping the top and the bottom faces 15 of the plate 10. The rubber element is preferably bonded during vulcanization to the overlapping faces of the plate 10, and also to the side faces of the plate 13. The opening 12 is slightly longer than the rubber element and therefore leaves a free opening between the element and the inner member and the ends of the opening 12. The plate 13 is designed to carry the load of the unit and when the rubber element is subjected to the load, it carries that load in shear, at least the major portion of the load. The rubber gives free shear action in all directions in the plane of the member 13. This is particularly desirable in devices such as an engine that has vibration impulses in all these directions due to torque and unbalanced conditions. The mounting, therefore, responds when the plate 13 is placed at right angles to the axis of the rotation, to cushion the unbalanced conditions and torque conditions through shear action of the rubber.

It is desirable in many installations that are subjected to shock, as in an automobile, to limit the free action of the mounting and under some circumstances to vary the free shear zone of the rubber under different conditions of load. This is accomplished in the present structure. The upper or load face of the rubber element is inclined at 16 and the lower or rebound face of the element is also inclined, but in the reversed direction, so that the upper face is slightly arched and the lower face is slightly cupped or channeled as indicated more particularly in Fig. 18 where the mounting is shown free of load. The inner member 13 is provided with slots 18 and a snubber plate 19 has a perforation through it with a surrounding flange 21. This opening is adapted to make a close fit with the plate 13. Portions of the flange 22 are forced inwardly into the perforation 18, so as to lock the snubber plate 19 with the plate 13. The rebound plate 23 has openings or slots 24 which receive projections 25 on the bottom of the plate 13. These projections are headed over as indicated in Fig. 17, and so lock the rebound plate in place.

The relation of the load and rebound surfaces and the plates 19 and 23 is such that with the mounting subjected to its normal load, the rubber is in free shear or in floating condition with very little modification of that condition, due to the snubber or rebound plates. But as the load increases, the engagement of the snubber plate extends outwardly on the upper surface of the mountings, thus reducing the free shear zone of the rubber which extends edgewise into the opening of the plate 10. The same action takes place at the rebound end. These inclines may be varied, giving greater or less freedom as desired in adapting the mountings to the peculiar conditions to which it is subjected.

It will be noted that as the load is increased or the rebound impulse is increased, the part of the rubber element directly above or below the overlapping surfaces is finally brought into action and here the snubbing action is sustained by a direct compression of the rubber between the overlapping faces and the snubbing plates. This gives a great capacity and consequently makes it possible to maintain the position of the engine within very small limits.

The snubbing plate 27 (Figs. 19 to 21) also has an extension which operates upon the rubber extensions 26. Consequently, the ultimate snubbing action of the plate is very materially increased and further tends to maintain very small limits of movement under severe shock. These extensions are preferably perforated at 28 to permit the placing of the bolts through the perforations 11. Otherwise, the mounting 9 corresponds to the mounting 8.

A mounting 9 is shown as secured to the transmission in Figure 1 at the rear of the engine by bolts extending through perforations 13a, the perforations in the plate permitting simple attachment to the rear of the case. Plate 10, is secured directly to a cross member by bolts 30 extending through perforations 11.

The front of the engine, in Figure 1, is carried on two mountings 8 inclined to a tangent relation to the center of oscillation. In the engine as it is thus mounted, it is free to respond to all unbalanced conditions through shear action of the rubber. It is free to respond to torque impulses also through shear action of the rubber. On the other hand, the snubbing action has a very large capacity, so that the engine is held within close limits, thus the normal floating condition of the engine may be very sensitive with a very effective limitation of ultimate movement under shock.

Figure 2:
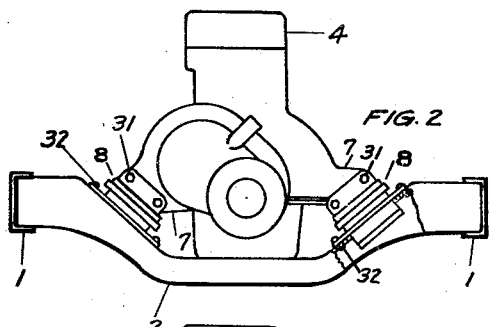
Fig. 2 shows a front elevation of the engine mounted as in Fig. 1.
Figure 3:
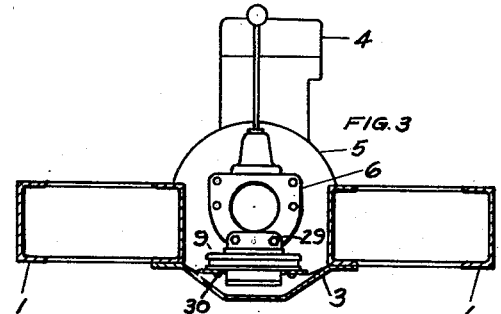
Fig. 3 is a rear elevation mounted as in Fig. 1.
Figure 4:
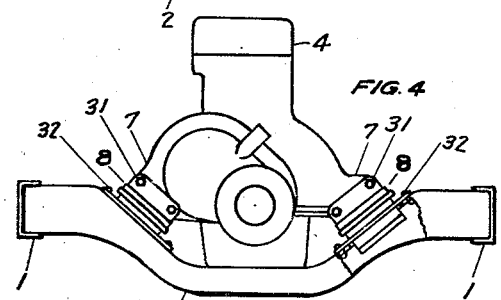
Figs. 4 and 5 show a front and rear view of an automobile engine with a modified mounting.
Figure 5:
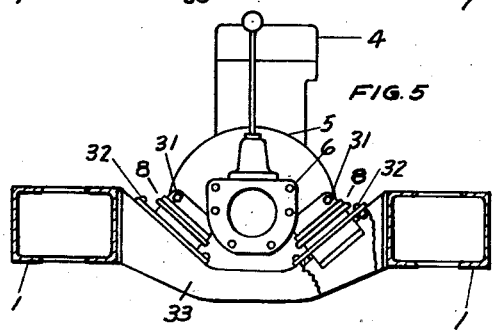

In the accompanying figures, a number of modifications are shown showing the wide adaptability of the joints. In Figs. 4 and 5, the front of the engine is mounted similar to that of Fig. 2, but the rear of the engine is carried on mounting joints 8, secured to the bell housing by bolts 31, and to the cross member 33 by bolts 32. The two mountings in this instance at the rear are set on an inclination.

Figure 6:
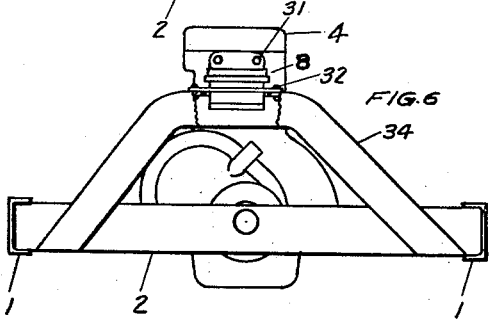
Figs. 6 and 7 show a front and rear view of a further modified mounting of an engine.
Figure 7:
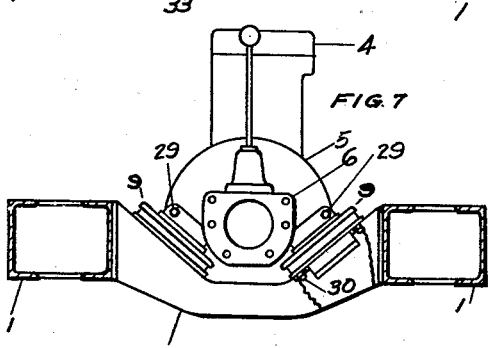

The modification shows that in Figs. 6 and 7, there are two mounting joints 9 attached to the bell housing and a cross member at the rear, these mountings being set at an inclination. At the front, the cross member has a strut 34 and a single mounting 8 is mounted at the upper portion of the strut and secured to the upper part of the engine.

In Figs. 8 and 9, the pair of mounting joints 8 set at an inclination are secured to the bell housing and to a cross member. The front end of the engine is supported on a strut 35 and is carried by a pair of mounting joints 36 hereinafter described which are secured to a bracket 37 on the upper front end of the engine and the mountings 36 are secured on the strut or frame 35.

In the structures shown in Figs. 10 and 11, the rear end of the engine is carried upon a mounting joint 9 secured to the transmission case and a rear cross member 3 and the front end of the engine is carried in the same manner as shown in Fig. 8.

In Figs. 12 and 13, the rear end of the engine is carried on a mounting joint 9 which is secured to the rear of the transmission case and to the cross member 3, and the front of the engine is carried on mounting joints 36 which are secured to arms 38 extending each side of the engine at approximately the crank shaft level.

The mounting joints 36 are illustrated in Figs. 22, 23 and 24. In these mountings there is a supporting plate 39 having the perforations 39a for receiving a bolt or rivet for securing the plate. The plate is provided with a circular opening 40 (see dotted lines Fig. 23). A central member 41 in the form of a tube extends through the opening and a rubber element 42 varies the overlap opening overlapping the faces of the plate 39 adjacent to the opening. The rubber element is secured to the plate by a surface union preferably by bonding during vulcanization, and to the tube 41 also, by a surface union, preferably bonded during vulcanization. The upper element of the surface of the element 43 is dome-shaped and the lower surface 44 cupped, as indicated in Fig. 24. The mounting is secured to the engine through a flange 45 extending to the upper plate 46, this plate acting as the snubber plate and under load having relation to surface 43 to give the range of free vibration desired and the variation of the shear zone that may be desired to give the proper characteristic to the mounting. The plate 46 is secured by bolt 47 extending through the plate and the tube 41 and through the bottom snubber plate 48, which operates with relation to the surface 44 to give the proper rebound relation to the surface 44. This may as in the case of the mounting 8 be given very close limitations or more freedom as it may be desired.

The mountings 36 do not have the free shear movement crosswise of the mounting as in the mounting 8, but they do have the shear movement axially, and do have a cushion movement crosswise.

These mounting joints make it possible to use a very cheap construction of mounting joint and a combination of mountings giving almost any characteristic of control of the vibratory action of the engine that may be desired.

Some of the advantages of these joints over prior structures are as follows:

The plate form inner member gives a bonding area more nearly corresponding to the overlapped bonded surface of the outer member.

The progressive snubbing reduces the free shear zone without excessive stress of any bonded surface at the extreme restriction of the zone.

Combining the progressive snubbing with the direct compressive snubbing on the overlapped portion gives a variation of control not attained with either type of snubbing alone.

With the plate form inner members all zones in the free shear space are of the same length so that the desired response to the restriction of the shear zone may be more readily achieved.

The two-way shear movement in connection with an overlapping supporting wall of rubber retains all the advantages of this overlapped type of mounting for the vertical load thrusts with the addition of endwise shear and at the same time shear freedom to accommodate endwise thrusts.

The relative shear resistance vertically and endwise may be varied by varying the comparative height and length of the rubber element.

What I claim as new is:

1. A cushion joint comprising inner and outer attaching members, the outer one of said members having a plate-like form comprising side plates forming an opening therebetween and the inner of said members being of plate-like form with its faces in the direction of the edges of the sides and disposed in the projected area of the opening and extending crosswise to the plane of the outer member and spaced from the edges of the sides, and an element of resilient material overlapping a face of the outer member and extending edgewise from the sides into free space in the opening, said element being secured to the attaching members by surface union with the overlapped face of the outer member and with the side faces of the inner member.

2. A cushion joint comprising outer and inner members, one of said members comprising side plates providing an opening between the plates, the inner element being in the projected area of the opening and extending crosswise to the plane of the plates; and an element of resilient material overlapping the faces of the plates and extending edgewise from the side plates into free space in the opening and secured to said members, and to one of said members at least by a surface union, said inner member and element being disposed relatively to the opening to afford greater freedom of movement of the members relatively to each other in the direction of the edges of the sides than crosswise thereof.

3. A cushion joint comprising outer and inner members, the outer member having a plate-like form with an opening through it, and the inner member being in the projected area of the opening and extending crosswise of the plane of the outer member, and an element of resilient material overlapping at least one face of the outer member along the side edges of the opening, said element extending edgewise from the sides of the opening into free space in the opening and being secured to the overlapped face of the outer member and to the face of the inner member and to one of them at least by surface union, the ends of the opening being spaced from the inner member and the element.

4. A cushion joint comprising two attaching members, both of which are of plate-like form, the face of the first of said members extending at right angles to the plane of the face of the second of said members and in spaced relation to the edge of the second of said members, and an element of resilient material overlapping a face of the second of said members and permanently secured to both of said members and to one of them at least by a surface union, said element projecting edgewise of the second member into free space between the members.

5. A cushion joint comprising two attaching members, both of which are of plate-like form, the face of the first of said members extending at right angles to the plane of the face of the second of said members and in spaced relation to the edge of the second of said members, and an element of resilient material overlapping a face of the second of said members and permanently secured to both of said members by surface bonding, said element projecting edgewise of the second member into free space between the members.

6. A cushion joint comprising two attaching members, both of which are of plate-like form, the face of the first of said members extending at right angles to the plane of the face of the second of said members and in spaced relation to the edge of the second of said members, and an element of resilient material overlapping both faces of the second of said members and permanently secured to both of said members and to one of them at least by a surface union, said element projecting edgewise of the second member into free space between the members.

7. A cushion mounting comprising two attaching members, both of which are plates, the face of the first said plates extending crosswise of and in spaced relation from the edge of the second of said plates; and an elongated element of resilient material overlapping the face of the second of said plates and permanently secured to both of said plates and to one of them at least by a surface union, said element projecting edgewise of the second plate into free space between members.

8. A cushion mounting comprising two attaching members, both of which are plates, the face of the first said plates extending crosswise of and in spaced relation from the edge of the second of said plates; and an element of resilient material overlapping the face of the second of said plates and permanently secured to both of said members by surface bonding, said element projecting edgewise of the second plate into free space between members.

9. A cushion joint comprising outer and inner attaching members of plate-like form, the outer member having an elongated opening therein, and the inner member extending crosswise of the plane of the outer member and through the opening; and an element of resilient material overlapping the face of the outer member at the sides of the opening and extending edgewise of said member into free space between the members, said element being permanently secured by surface bonding to both of said members, the inner member and element being positioned relatively to the ends of the opening to afford greater freedom lengthwise of the opening, than crosswise of the opening.

10. A cushion joint comprising an attaching member of plate-like form; a load carrying element of resilient material overlapping the face of said member and secured thereto by bonding to the overlapped face, said load carrying element projecting edgewise of the member into free space, having a snubbing surface facing substantially at right angles to and spaced from the face of the member; a snubber member arranged over and engaging said snubbing surface, the snubbing member and surface being related to vary the free shear zone of the load carrying element between the snubbing member and the edge of the attaching member as the snubber element is depressed.

11. A cushion joint comprising an attaching member of plate-like form; a load carrying element of resilient material overlapping the face of said member and secured thereto by bonding to the overlapped face, said load carrying element projecting edgewise of the member into free space, having a snubbing surface facing substantially at right angles to and spaced from the face of the member; a snubber member arranged over and engaging said snubbing surface, the snubbing member and surface being related to vary the free shear zone of the load carrying element between the snubbing member and the edge of the attaching member as the snubber element is depressed, said snubbing member extending over the overlapping portion of the element for increasing the ultimate snubber action.

12. A cushion joint comprising an attaching member of plate-like form; a load carrying element of resilient material overlapping the face of said member and secured thereto by bonding to the overlapped face, said load carrying element projecting edgewise of the member into free space, having a snubbing surface facing substantially at right angles to and spaced from the face of the member; a snubber member arranged over and engaging said snubbing surface, the snubbing member and surface being related to vary the free shear zone of the load carrying element between the member and the edge of the attaching member as the snubber member is depressed, said member extending over the overlapping portion of the element increasing the ultimate snubber action; and a snubber element overlapping the attaching member at the end of the load carrying element, said snubber member extending over and engaging this snubber element.

13. A cushion joint comprising an attaching member of plate-like form having an opening therethrough, providing a peripheral edge; a load carrying element of resilient material overlapping the face of said member along opposing portions of said edge and secured thereto by bonding, said load carrying element projecting edgewise of the member into free space in the opening and having a snubbing surface facing at right angles to and spaced from the face of the member; a snubber member, said snubber member and surface being related to vary the free shear zone of the element between the snubber member and the edge of the attaching member as the snubber member is depressed.

14. A cushion joint comprising an attaching member of plate-like form having an opening therethrough, providing a peripheral edge; a load carrying element of resilient material overlapping the face of said member along opposing portions of said edge and secured thereto by bonding, said load carrying element projecting edgewise of the member into free space in the opening and having a snubbing surface facing substantially at right angles to and spaced from the face of the member; a snubber member arranged over and engaging said snubbing surface, the snubbing member and surface being related to vary the free shear zone of the element between the snubber member and the edge of the attaching member as the snubber member is depressed, said snubber member extending over the portion of the element overlapping the attaching member and increasing the ultimate snubbing action.

15. A cushion joint comprising an attaching member of plate-like form; a load carrying element of resilient material overlapping both faces of the member and secured thereto by bonding to the overlapping faces, said load carrying element projecting edgewise of the member into free space and having a snubbing surface facing substantially at right angles to and spaced from the face of the member and a rebound surface opposite the snubbing surface; a snubber member arranged over and engaging the snubbing surface, the snubber member and surface being related to vary the free shear zone of the element between the snubber member and the edge of the attaching member as the snubber member is depressed, said member extending over the overlapped portion of the element for increasing the ultimate snubbing action; and a snubbing member adapted to engage the rebound surface.

16. A cushion joint comprising inner and outer attaching members of plate-like form the outer member having an oblong opening providing side edges, and the inner member extending through the opening and at right angles to the face of the outer member and spaced from the side edges of the outer member; an element of resilient material overlapping a face of the outer member and extending edgewise into free space between the members, said element being secured to said member by surface bonding and having a snubber surface facing at right angles to the outer member; and snubbing abutments having snubbing surfaces mounted on the outer member beyond the element; and a snubbing member adapted to engage the snubber surfaces of such abutments.

17. In an apparatus having a rotating part; a cushion mounting for the apparatus having an attaching member of plate-like form extending in the direction of the axis of the rotating part; a cross member of plate-like form spaced from the edge of said attaching member and positioned at substantially right angles thereto and to the axis of the rotating part; an element of resilient material overlapping the attaching member and extending edgewise therefrom into free space between the members and secured to the faces of the members by a surface union, said element in the space between the members being in shear relation radially and tangentially to the rotating part.

18. In an apparatus having a rotating part; a cushion mounting for the apparatus having an attaching member of plate-like form extending in the direction of the axis of the rotating part; a cross member of plate-like form spaced from the edge of said attaching member and positioned at substantially right angles thereto and to the axis of the rotating part; an element of resilient material overlapping the attaching member and extending edgewise therefrom into free space between the members and secured to the faces of the members by a surface union, said element having a snubbing surface facing at right angles to the attaching member and a snubbing member secured to the cross member of plate-like form and adapted to engage said snubbing surface.

19. In an apparatus having a rotating part; a plurality of cushion mountings spaced along the axis of the rotating part with a plurality of mountings spaced circumferentially about the axis at least at one point along the axis, and at least one mounting along the axis being in the vertical plane of the axis of the rotating part, each mounting having an attaching member of plate-like form extending in the general direction of the axis of the rotating part, a cross member of plate-like form spaced from the edge of the attaching member and in a plane substantially at right angles to the axis of the rotating part, and an element of resilient material overlapping the attaching member and extending edgewise into free space between the members of plate-like form and secured to the members of plate-like form by a surface union, the element being arranged in each mounting in shear relation radially and tangentially to the rotating part.

20. A cushion joint comprising two attaching members, of plate-like form, the face of the first of said members extending crosswise of and in spaced relation from the edge of the second of said members; an element of resilient material overlapping the face of the second of said members and permanently secured to both of said members by surface bonding, said element projecting edgewise of the second member into free space between the members, said element having a snubbing surface facing substantially at right angles to and spaced from the face of said second member, and a snubbing member arranged over and engaging said snubbing surface, the snubbing member and surface being related to vary the free shear zone of the load carrying element between the snubbing member and the edge of the second member as the snubber member is moved toward the second of said members.

21. A cushion joint comprising two attaching members, of plate-like form, the face of the first of said members extending crosswise of and in spaced relation from the edge of the second of said members; an element of resilient material overlapping the face of the second of said members and permanently secured to both of said members by surface bonding, said element projecting edgewise of the second member into free space between the members, said element having a snubbing surface facing substantially at right angles to and spaced from the face of said second member, and a snubbing member arranged over and engaging said snubbing surface, the snubbing member and surface being related to vary the free shear zone of the load carrying element between the snubbing member and the edge of the second member as the snubber member is moved toward the second of said members, said snubbing member extending over the overlapping portion of the element for increasing the ultimate snubbing action.

THOMAS LORD.